Figure 1:
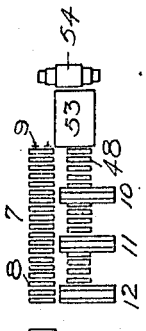

M. W. HOGLE & W. W. SLICK.
METHOD OF ROLLING METAL SHEETS AND PLATES.
APPLICATION FILED MAR. 13, 1907.

947,429.

Patented Jan. 25, 1910.
4 SHEETS—SHEET 1.

WITNESSES.

INVENTORS.

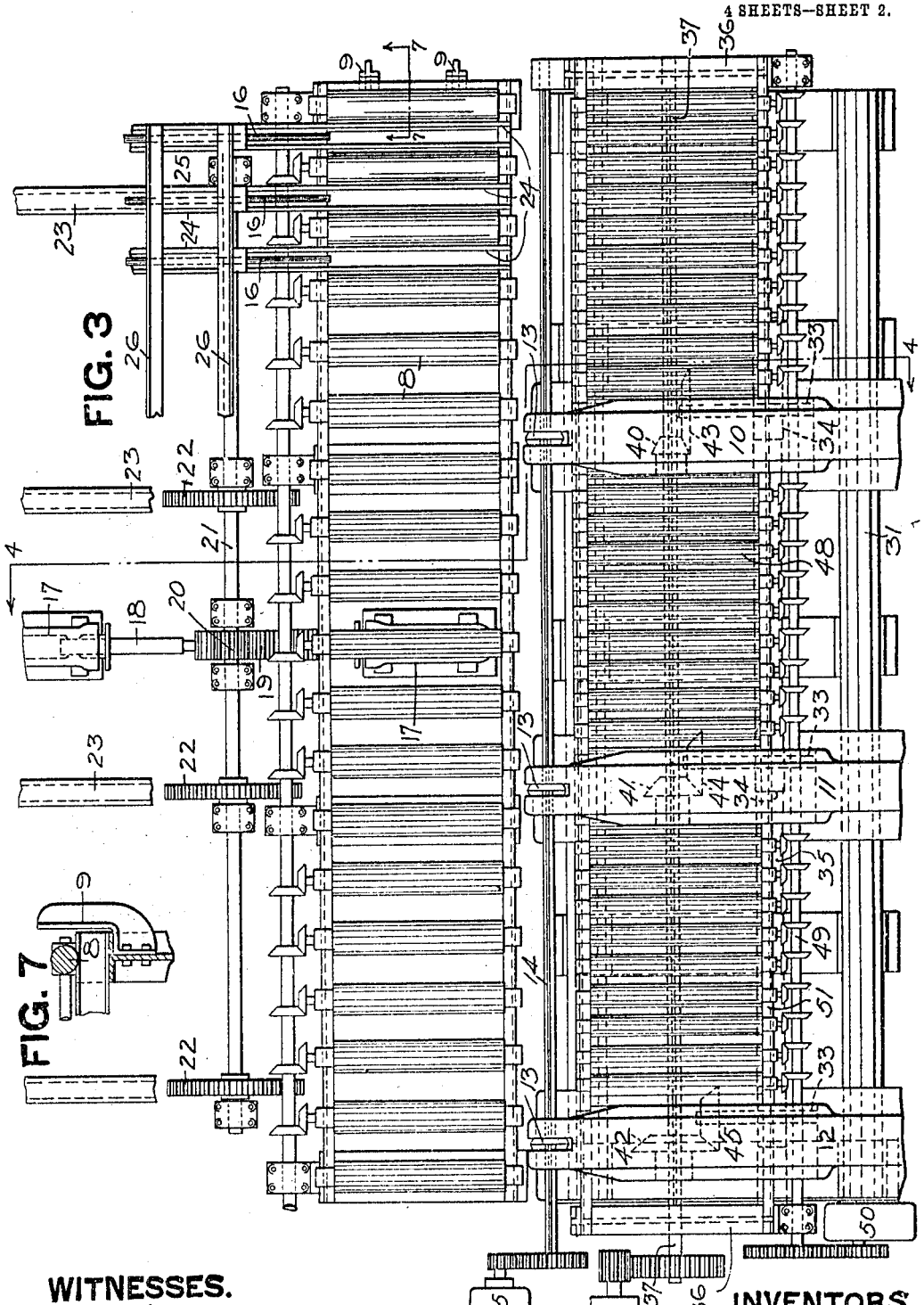

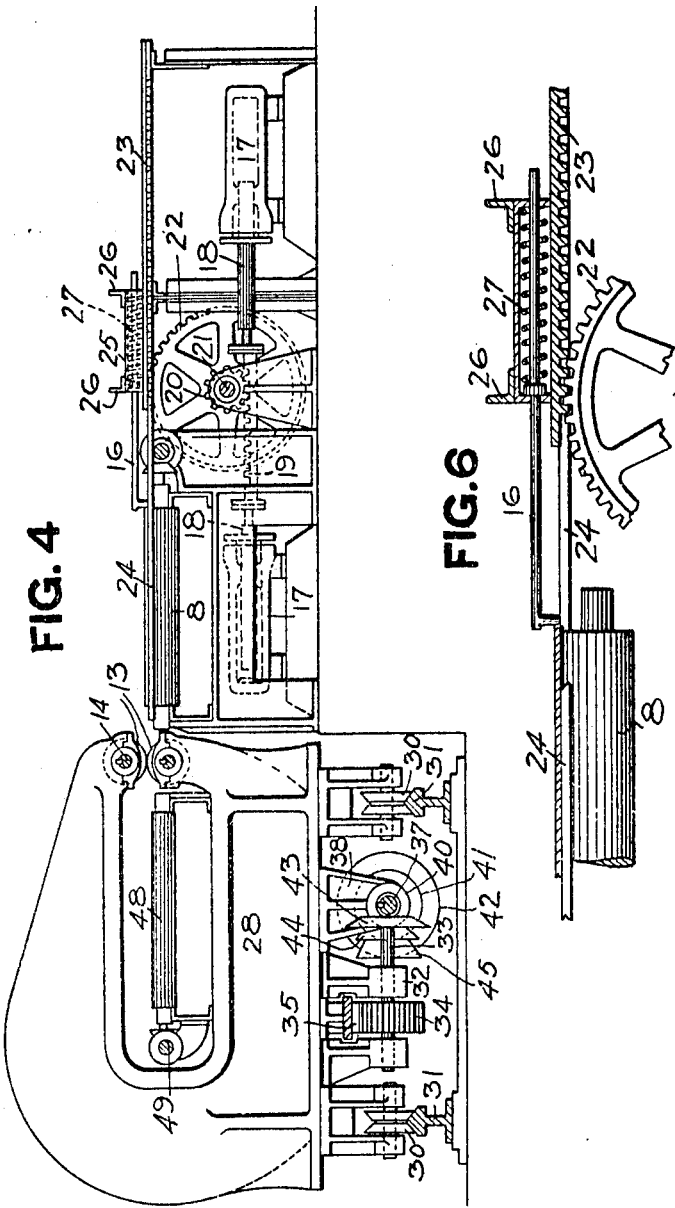

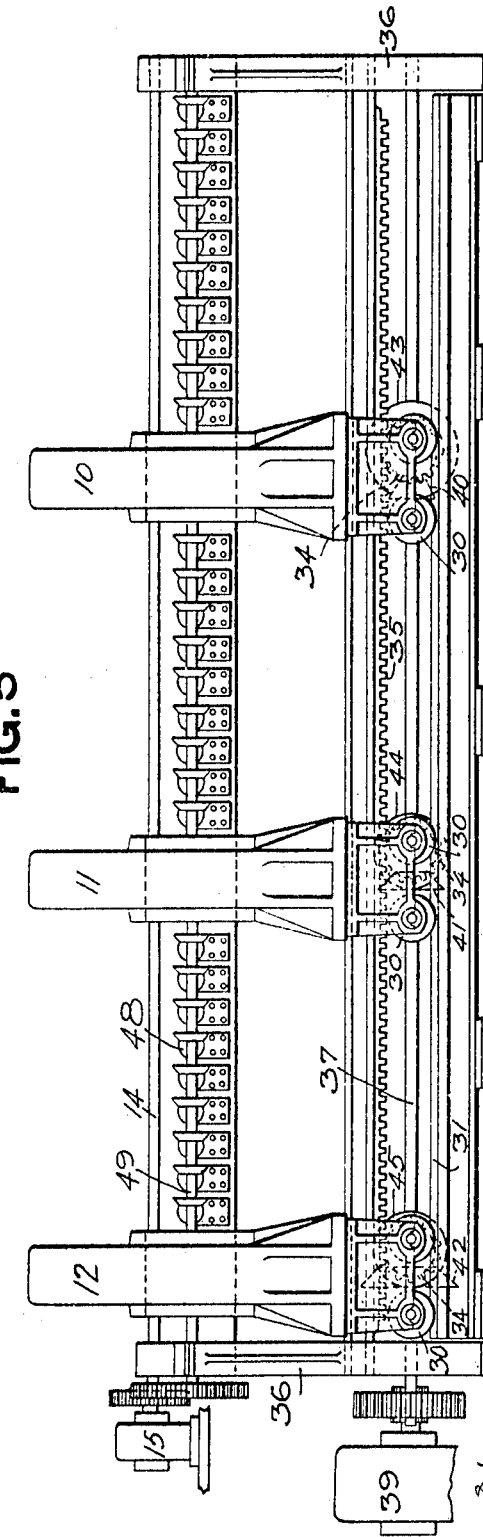

UNITED STATES PATENT OFFICE.

MILTON W. HOGLE AND WILLIAM W. SLICK, OF PITTSBURG, PENNSYLVANIA, ASSIGNORS TO PERCY E. DONNER, OF PITTSBURG, PENNSYLVANIA.

METHOD OF ROLLING METAL SHEETS AND PLATES.

947,429.  Specification of Letters Patent.  Patented Jan. 25, 1910.

Application filed March 13, 1907. Serial No. 362,193.

*To all whom it may concern:*

Be it known that we, MILTON W. HOGLE and WILLIAM W. SLICK, residents of Pittsburg, in the county of Allegheny and State of Pennsylvania, have invented a new and useful Improvement in Methods of Rolling Metal Sheets and Plates; and we do hereby declare the following to be a full, clear, and exact description thereof.

This invention relates to a method of rolling metal plates and sheets and more especially for rolling black plate.

The object of the invention is to provide a method of rolling metal sheets or plates whereby the scrap loss incident to continuous mill practice is very greatly decreased and sheets of uniform gage produced.

According to the ordinary practice of rolling black plate, a number of plate bars of a length equal to the width of the plate to be produced, plus a small amount to allow for side scrap, and usually from three-eighths of an inch to five-eighths of an inch in thickness and about eight inches wide, are heated in a pile in a furnace and rolled down one after the other and then piled for further rolling. Since the bars are heated in a pile they cannot be heated uniformly and are therefore at different temperatures on entering the rolls so that the hotter bars are necessarily drawn out to a greater length and a thinner gage than the cooler bars. This means that the plates entering the matcher to be piled are of different lengths, and of different gages and in continuous mills now in operation it has been noted that there is never less than six inches difference between the longest and shortest plates of any pile. Since the actual usable length is that of the shortest plate, all portions of the longer plates extending beyond the rear end of the shortest plate are useless and might just as well be sheared off at the time of matching as later on. Each plate also has a ragged rear or crop end which must be sheared off, and these together with the excess length of the longest plates, produce a large amount of scrap. Furthermore, in continuous mill practice there is always a slight interval of time between the rolling of the first and last bars for a given pack, and it frequently happens that there is quite a long lapse of time. Consequently, even if the bars were originally heated uniformly and the plates produced by the roughing down were of uniform lengths, they would nevertheless not be of uniform temperatures in the pack, the bottom ones in the pack being colder than the others. The consequence is that in rolling down the pack the hotter plates reduce to a thinner gage than the colder ones. This not only results in producing further scrap, but uniformity in gage is also impossible with present continuous mill practice. The loss due to scrap is excessive.

Our invention is intended to overcome these defects and to provide a method of continuous mill practice whereby scrap is reduced to a minimum and sheets of uniform gage produced.

Briefly stated, the invention consists in use of a blank or bar of greater dimensions than the standard sheet bar, say two, three, four or other multiple times the dimensions of the ordinary standard bar, depending upon whether the pack is to contain two, three, four or more sheets, said blank being heated singly and roughed out, preferably in a continuous mill, and while still hot has its crop end removed and the remainder divided into sections of equal length, which are immediately piled and said pile then reduced, preferably in a continuous mill. By this procedure all of the plates making up the pack are produced from a single blank or bar, thus insuring uniformity of temperature of the original blank, are rolled, sheared and piled at a single operation, so that all of the sheets making up the pile have the same temperature because the time interval between the beginning of rolling and the piling is the same for each sheet or plate, and consequently when said pack is rolled out the sheets elongate to the same extent, thus producing sheets of uniform gage and length, whereby scrap is largely eliminated.

This application covers the method shown and described in our application, Serial No. 318,011, filed May 21, 1906, in which the apparatus shown in this application is claimed.

The accompanying drawings show organized mechanism suitable for carrying out our invention.

Figure 2:
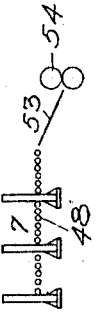
Figure 2:
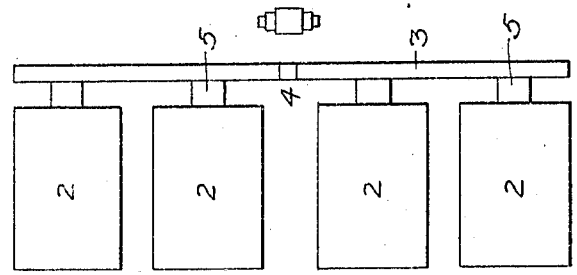
Figure 2:
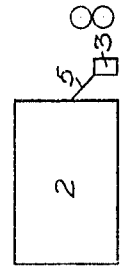

In said drawings Figure 1 is a diagrammatic plan view of the apparatus; Fig. 2 is a diagrammatic view of same in side elevation; Fig. 3 is a plan view of the shearing mechanism; Fig. 4 is a transverse vertical section of the same on the line 4—4 Fig. 3; Fig. 5 is a side elevation of the same; and Figs. 6 and 7 are detail views.

In the drawings 2 represents a series of heating furnaces in which the slabs or long bars are heated. In front of these furnaces are conveyers or feeding tables 3 leading to a common receiving table 4. Inclines 5 lead from each furnace to the conveyers or feeding tables 3. The roughing or first reducing rolls are shown as a continuous mill composed of six stands of two-high rolls 6. Suitable conveying tables or mechanism will be provided for feeding the bars through these roll stands in succession. In line with this continuous mill is a conveyer 7, preferably a table having a series of live rollers 8, such as are well known in mill practice. At the front end of this roller table are stationary stops 9 against which the forward end of the partially reduced bar strikes. Arranged at the side of the roller table 7 are a series of cutters for severing the long plate into sections of uniform length and to remove its rear or crop end. The drawings show three such cutters 10, 11 and 12. Each cutter may be a saw or other cutter, and is shown as consisting of rotary slitting shears or disks 13, one above the other, and one or both of which is positively driven, the drawings showing the top disks connected to a shaft 14, which is driven from any suitable source of power, such as from the motor 15. The plate is transferred to these cutters by pushers 16, operating across the roller table 7 and actuated by any suitable mechanism. The drawings show for this purpose a pair of single-acting power cylinders 17 whose piston rods 18 are connected to a rack bar 19. The latter meshes with a pinion 20 on a shaft 21, extending longitudinally of the roller table. This shaft has secured thereto a number of toothed wheels 22 which engage racks 23 on slides 24 mounted on suitable guides 25 extending transversely of the roller table. These slides are connected by the longitudinally extending angle bars 26, and carry compression springs 27, to which the pushers 16 are connected. The springs permit the pushers to yield in case their forward ends strike the shears or other obstruction.

As many shears will be employed as necessary to sever the partially reduced bar into the desired number of sections. In most sheet mill practice the packs consist of two or three sheets. Consequently three shears will ordinarily be found to be sufficient, although the number may either be two or any number greater than three. In order to adapt these shears to plates of varying length, as are bound to occur due to different heats of the slabs or bars, or to different weights or sizes of bars, the said shears are shifted longitudinally of the roller table so that the entire perfect portion of the plate, no matter what its length, will be divided into a number of sections of equal length. To permit of this each pair of shears is mounted in a housing or frame 28. These frames are provided with wheels 30, running on rails or tracks 31 on the mill floor. Depending from these frames are hangers or pillow blocks 32 in which are mounted transverse shafts 33, each provided with a gear 34, meshing with a rack 35, which is held stationary by having its ends secured to the end stands or frames 36. Each of the transverse shafts 33 is connected by beveled gears to a longitudinal shaft 37 mounted in suitable hangers 38 on the several shear frames and driven from any suitable source of power, such as the motor 39. The beveled gears 40, 41 and 42 on the shaft 37 are keyed or otherwise secured thereto so that they can freely slide on said shaft and the shaft bearings also freely slide over the shaft, so that the shaft can remain stationary and not interfere with the shifting of the shear frames.

Beveled gears 43, 44 and 45 on the transverse shafts 33 mesh respectively with the beveled gears 40, 41 and 42. These several sets of gears are of varying sizes, as shown, so that the several transverse shafts 33 are driven at different speeds. These sets of gears are so arranged that the beveled gears on the frame of the first shears 10 give a slow speed to its transverse shaft 33, while those on the frame of the next shears 11 give a higher speed to its transverse shaft, and those on the frame of the next pair of shears 12 give still a higher speed. These gears are so arranged that the speeds of the several shear frames are in ratio of 1, 2, 3, and so forth, in case a larger number of shears is used. Consequently the several shear frames can be shifted simultaneously in either direction, and the second shear frame is shifted through twice the distance of the first shear frame, while the third shear frame is shifted through three times that distance. While therefore the shears are shifted to vary the distances therebetween, still the several distances between the shears are always uniform. Consequently the plate or bar being sheared is always cut into sections of uniform length.

The shears are provided with a roller table, comprising live rollers 48, driven from the shaft 49 by means of a motor 50, as will be readily understood. These rollers are mounted on beams 51, having no connection with the several shear frames, but being secured at their ends to the stands 36.

In front of the shear table is a matcher 53, which may be of any type whereby the sheets are piled one on top of the other and their front and side edges accurately matched. From this matcher the piled sheets pass to the second set of reducing rolls, these being shown as a tandem train composed of four stands of two high rolls 54.

In carrying out our method, the blanks or plate bars are either two, three or other multiple number of times longer, or wider, than the ordinary sheet bar, depending upon the number of plates to be piled before passing through the second reducing trains. These blanks are heated in the furnace 2, and then passed singly through the first reducing train, being thereby roughed down or partly reduced to gage. A long plate of proper matching thickness results from this first rolling operation and this is brought to rest on the roller table 7 by its front end striking against the stops 9. The front end of the plate is usually quite square, but the rear end is irregular and must be removed. If the several shears are not in proper position, they will be brought into such position by rotating the shaft 37, which through the differently beveled gear trains described moves the several shear frames in the required direction and through varying distances. The shears are moved until the last shear of the series is in proper position to cut from the plate the required amount of ragged or crop end. The shears are then in such position that when the plate is pushed into the same, the rear or crop end of the plate is cut off and the remainder simultaneously sheared or divided into a number of sections of absolutely uniform length. The plate is fed to the shears by the pusher 16 operated by the mechanism described. During the shearing of the plate the rollers 48 of the shear table are at rest, but as soon as the plate is sheared the shaft 49 is rotated, thus starting the rollers 48 of the shear table and feeding the several plates longitudinally into the matcher 53 in which they are automatically piled and their edges matched. The piled plates then pass through the second reducing train.

On account of the employment of the multiple blank, so rolling at one time a plate of proper matching thickness and of sufficient length to form two or more sections for matching, and the simultaneous shearing of this hot plate into such sections, and the carrying of the same longitudinally for quick matching, makes it practicable to accomplish the rolling from the multiple sheet bar to the matcher and rolled pack at a single heat because of the rapid operations made possible through the above manipulation. The succession of steps are rolling, simultaneous shearing into sections, longitudinal piling to form the pack, and immediate rolling of the pack.

It will be obvious that with the foregoing method there will be only one crop end for the two, three or more plates to be piled, and consequently the amount of scrap due to crop ends is reduced to this amount. Furthermore, there is no scrap due to the excessive length of some sheets over the others, as in the old practice, due to different degrees of heat and different degrees of elongation of the original bar, or other blank. The total amount of scrap produced by our method is never more than one-third of that produced under the old practice, and in many cases not more than one-eighth of the same. Furthermore, all of the sheets making up the pack are of the same heat and of uniform gage and length, so that in further reduction uniformity of gage is maintained. This does away with the sorting of the sheets for gage which is necessary under the old practice.

What we claim is:

1. The method of rolling sheet metal at a single heat, consisting in heating a multiple blank, rolling it continuously to a plate of matching thickness, simultaneously shearing this plate at several points to produce sections of equal length, carrying the sections longitudinally to form a pack, and reducing the pack by continuous rolling.

2. The method of rolling sheet metal at a single heat, consisting in heating a multiple blank, rolling it continuously to a plate of matching thickness, immediately shearing the hot plate into sections of equal length by a side movement of the plate and shears with relation to each other, carrying the sections longitudinally to form a pack, and reducing the pack by continuous rolling.

3. The method of rolling sheet metal at a single heat, consisting in heating a multiple blank, rolling it continuously for a number of passes, then while still hot feeding it sidewise into multiple shearing mechanism and simultaneously dividing it into sections of equal length, and immediately forming a pack of the sections so formed and reducing the pack by continuous rolling.

In testimony whereof, we the said MILTON W. HOGLE and WILLIAM W. SLICK have hereunto set our hands.

MILTON W. HOGLE.
WILLIAM W. SLICK.

Witnesses:
ROBERT C. TOTTEN,
J. R. KELLER.